United States Patent [19]

Clarke

[11] Patent Number: 4,947,071
[45] Date of Patent: Aug. 7, 1990

[54] HIGH SPEED DC MOTOR

[76] Inventor: Craig Clarke, P.O. Box 505, Twenty-Nine Palms, Calif. 92277

[21] Appl. No.: 154,334

[22] Filed: Jan. 30, 1988

Related U.S. Application Data

[63] Continuation-in-part of Ser. No. 10,003, Feb. 2, 1987, abandoned.

[51] Int. Cl.⁵ .............................................. H02K 31/00
[52] U.S. Cl. .................................... 310/177; 310/46; 310/68 B; 310/180; 310/156; 250/231.13; 318/254; 318/480
[58] Field of Search ................ 310/46, 68 R, 68 A, 310/68 B, 156, 177, 180, 184, 12, 13, 254, 262, 264, 90.5, 181, 154; 250/231 SE; 318/138, 480, 254, 135

[56] References Cited

U.S. PATENT DOCUMENTS

| | | | |
|---|---|---|---|
| 1,666,065 | 4/1928 | Anderson | 310/46 |
| 1,859,643 | 5/1932 | Worthington | 310/46 |
| 1,863,294 | 6/1932 | Bogia | 310/46 |
| 2,232,097 | 2/1941 | Deal | 310/46 |
| 3,324,370 | 6/1967 | Studer | 318/138 |
| 3,366,862 | 1/1968 | Beck | 318/480 |
| 3,377,534 | 4/1968 | Hill | 318/480 |
| 3,924,167 | 12/1975 | Clark | 318/254 |
| 4,158,800 | 6/1979 | Jahelka | 318/685 |
| 4,435,673 | 3/1984 | Hagino | 318/138 |
| 4,507,590 | 3/1985 | Miyazaki | 318/254 |
| 4,559,448 | 12/1985 | Rozsa | 250/231 SE |
| 4,698,567 | 10/1987 | Gottwald | 318/480 |
| 4,720,662 | 1/1988 | Lanser | 318/138 |
| 4,743,813 | 5/1988 | Tassinario | 318/254 |
| 4,746,844 | 5/1988 | MacKelvie | 310/68 R |

Primary Examiner—R. Skudy
Attorney, Agent, or Firm—Poms, Smith, Lande & Rose

[57] ABSTRACT

The stator electromagnets (80', 82', 84', 86', 88', 90') face inward about the rotor cavity (12) of the motor. Spaced horseshoe magnets (70) with spaced apart, opposite poles face outward about the periphery (22) of the rotor (20). The stator electromagnets are in two arrays. Each array is aligned with one pole of the rotor set of horseshoe magnets and has a pulling electromagnet (80' or 86') of a pole opposite to the pole of the rotor magnet. Each array also includes two pushing electromagnets (82', 84' or 88', 90') circumferentially offset from the pulling electromagnet, which are of a magnetic pole the same as the pole of the rotor magnet. Optical sensors (173, 175), which are axially aligned with the electromagnets, sense the position of rotor with regard to points on the stator. Switches on a circuit card associated with each array of electromagnets connect to the corresponding optical sensor for alternatively passing or blocking current to the electromagnets. The switches energize and de-energize the pulling and pushing electromagnet when the rotor magnet passes an adjacent, preceding, pulling electromagnets when the rotor magnet passes a predetermined position.

27 Claims, 7 Drawing Sheets

HIGH SPEED DC MOTOR

BACKGROUND OF THE INVENTION

1. Field of Invention

This invention relates to a DC motor, especially one with a very high rotational velocity.

2. State of the Prior Art

Motors that rotate at very high speed are desirable, but there are many reasons that ultra-high speeds are difficult to attain. Most motors cannot switch the electromagnets fast enough because they use a mechanical commutator to transmit electricity from the stator to the rotor. Most also rely only on magnetic attraction. These motors suffer from inherent frictional losses and are susceptible to rapid degradation. They also produce radio frequency interference by the sparking of the commutator brushes. These devices are incapable of self-starting and require a generator to initiate the operation of the motor. The need for a generator subjects the motor to erratic behavior caused by temperature responsive zero drift. The use of a generator also complicates the circuitry of the motor.

Several brushless DC motors have been developed with varying degrees of success. The initial brushless motors used a permanently magnetized rotor and a plurality of stator windings. As a selected stator winding is energized, the rotor turns, which reduces the torque angle between the magnetic fields of the stator and of the rotor. Rotation is maintained by sequentially energizing the stator windings so that a large torque angle always exists. Stationary inductive pick-up coils determine the position of the rotor relative to the stator so that the electrical commutator can activate the desired stator winding at a rate proportional to the angular velocity of the rotor. Rotation of the permanently magnetized rotor induces the voltages within the pick-up coils. The coil arrangement is incapable of self-starting the motor without elaborate starting mechanisms.

U.S. Pat. No. 3,324,370 to Studer (1967) discloses a brushless DC motor using an electronic beam switching tube as a commutator. The electronic beam switching device includes pulse input switches that sequentially switch a plurality of outputs to succeeding outputs. A variable frequency oscillator, which responds to control signals from a pick-up coil transducer device, and a rotor position sensing device control the switches. Rotation of the magnetic rotor induces a voltage in the coil. An increase in the rotor's angular velocity marks an increase in the transducer's voltage. This results in a greater output frequency from the oscillator. The motor uses one layer of approximately ten windings, which surround a permanently magnetized rotor. As electron beam switching tube activates each winding sequentially to maintain a torque angle between the windings and the rotor. The ten stator pole motor is said to be able to produce a rotation of about 8000 rpm.

U.S. Pat. No. 3,924,167 to Clark (1975) discloses a two pole, permanent magnet rotor positioned within a stationary armature. The stationary armature has three symmetrically positioned sets of windings, each set of windings occupying 120° of the armature surface. The motor also includes a self-commutation means which produces three switching signals. The on/off variations in the signals indicate the passage of a reference radius on the rotor by each of the rotor's three equiangularly spaced reference points. The three switching signals energize the three sets of windings in sequence to allow the continuous operation of the motor. The use of only three sets of windings requires each set to carry a relatively large magnetic field to produce a force large enough to rotate the rotor.

The stepper motor in Jahelka, U.S. Pat. No. 4,158,800 (1979) uses a closed loop feedback system that includes a coded disk driven by the motor and decoding means to derive signals from the disk. The signals include direction signals, select signals and speed signals. The velocity of the motor varies relative to the lead angle created between the energized motor windings and the motor shaft position.

U.S. Pat. No. 4,507,590 to Miyazaki (1985) discloses a brushless DC motor with a single position detector. This design includes drive coils on the stator a magnetic rotor with alternating poles, a position detector and a drive circuit that supplies current to the drive coils. The position detector reads information from the rotor, which a code converter converts to digital phase signals. A digital-to-analog converter changes the output to an analog signal, which is amplified and applied to the coils. This device requires a position detector for each phase coil used. The plurality of position detectors needed complicates the circuitry of the motor and sets a relatively low maximum number of phase coils which can be used in the motor's design. The low number of phase coils restricts the power derived from the motor. This design also tends to produce harmonic components that can interfere with the operation of the motor.

The foregoing devices represent improvements in the design of brushless DC motors. However, these devices are incapable of efficiently and effectively rotating the rotor within the stationay stator. The ability to expand these devices is also very limited. The circuitry required to increase the number of windings in each of these designs renders the expansion of these motors impractical.

SUMMARY OF THE INVENTION

One object of the present invention is to disclose and provide a DC motor capable of very high angular velocities. Another object of the present invention is to disclose and provide a DC motor that does not rely on brushes for selectively energizing electromagnets and that uses attraction and repulsion from the electromagnets. Another object of the present invention is to disclose and provide a DC motor that is self-starting and that minimizes frictional losses between the stator and the rotor. Another object of the present invention is to disclose and provide a novel arrangement for the magnets of a DC motor and novel arrangements for the system controlling the energizing and de-energizing of the magnets.

The exemplary embodiments described in this application are rotating motors in which a rotor rotates in a stator. Linear "motors" such as those proposed to translate large loads or particle accelerators may also use many parts of the invention.

The DC motor of the present invention has a stator, which has a central rotor cavity. A stator set of electromagnets faces inward about the rotor cavity. A rotor, which has a rotor set of magnets, rotates in the central rotor cavity. The rotor set of magnets are horseshoe magnets with spaced apart, opposite poles facing outward about the periphery of the rotor. The stator electromagnets are in groups of two arrays each. Each array is aligned with one pole of the rotor set of horseshoe magnets. Each array has a first, center, usually pulling electromagnet positioned so that the pole of the rotor magnet passes under the first electromagnet. The center electromagnet has a magnetic pole when energized usually the opposite to the pole of the horseshoe magnet. Each array also includes two adjacent, axially aligned second, usually pushing electromagnets circumferentially offset from the first, center electromagnet such that the pulling and pushing electromagnets form a triangle. The pushing electromagnets are of a magnetic pole when energized the same as the pole of the rotor magnet. All electromagnets in both arrays can be magnetically reversed as needed.

Substantial changes in the position, order, magnetic pole and energizing order are possible.

In one embodiment, optical rotor position sensors are provided for each group of stator electromagnets. One rotor position sensor is axially aligned with the pulling electromagnets of the side-by-side arrays of a group, and the other rotor position sensor is axially aligned with the pushing electromagnets of the arrays of a group for sensing the position of points on the rotor relative to the corresponding points on the stator. Switches on a circuit card associated with each group and both arrays of stator electromagnets connect to a corresponding rotor position sensor for alternatively passing or blocking current to selected electromagnets. The switches energizes the pulling electromagnet when the rotor magnet passes an adjacent, preceding, pulling electromagnet and de-energizes the first electromagnet when the rotor magnet reaches the pulling electromagnet. The switches also energizes the pushing electromagnets when the rotor magnet is axially aligned with the pushing electromagnets and de-energizes the pushing electromagnets when the rotor magnet is axially aligned with adjacent, subsequent pulling electromagnets.

In the first embodiment, the sensors include light relays on the stator adjacent to the pulling and pushing electromagnets. The light relays focus a light beam towards a reflective surface on the rotor. The light relays emit light whenever the motor is energized but receive light only if the light relay is aligned with the reflective surface. One of a pair of light receiving sensors, located adjacent to the light relay signals receipt of the reflected light. The sensors signal the switches for controlling the pulling and pushing electromagnets.

Magnetic ring bearings are located between the stator and the rotor. The magnetic ring bearings consist of separate bands of individual high energy magnets. Each band of bearings on the rotor repels the magnets on the aligned lower stator band. One may reverse some of the magnets on the upper half of the stator bands to attract the opposite band. The outer band of each bearing is embedded along the inner diameter of the stator. The magnets provide a magnetic cushion which supports the rotor within the inner cavity of the stator. They cause the rotor to float within the stator to eliminate frictional contact between the two components.

A magnetic radial bearing, located at each end of the rotor and stator eliminate contact between the rotor and the stator and the stator.

Further objects and features of the invention will be apparent to those skilled in the art from the following detailed description of the preferred embodiment.

BRIEF DESCRIPTION OF THE DRAWINGS

FIG. 3 is a plan view of the inside surface of the stator of the brushless DC motor of the present invention in which the rotor rotates. FIG. 3 is drawn as if the surface is flat. It curves in the present invention.

DETAILED DESCRIPTION OF THE PREFERRED EMBODIMENTS

Figure 1:
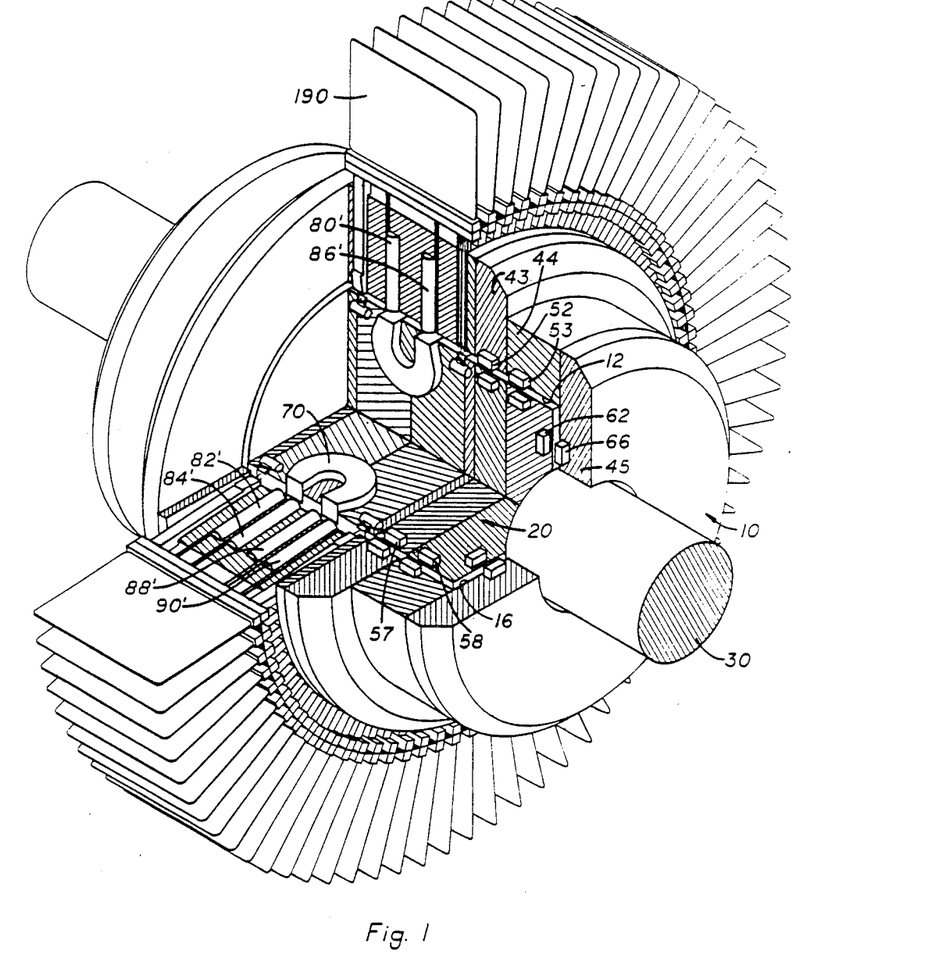
FIG. 1 is a perspective, cut-away view of the brushless, first embodiment of the DC motor of the present invention.
Figure 2:
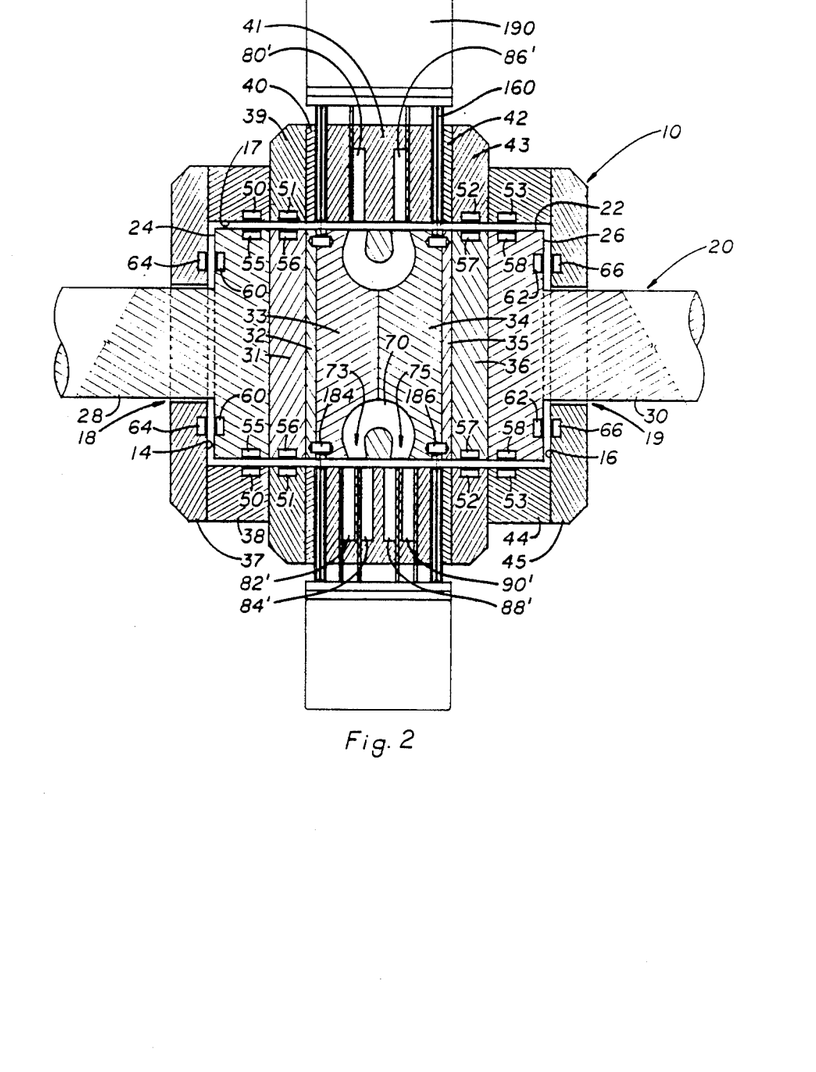
FIG. 2 is a sectional view of the brushless DC motor of the present invention.

The brushless DC motor of the present invention has a stator, which has a central rotor cavity. In the first exemplary embodiment, the central rotor cavity 12 of stator 10 (FIG. 1) has a cylindrical wall 17 and two end walls 14 and 16. Rotor 20 is located within central rotor cavity 12 as FIGS. 1 and 2 show. Rotor 20 has an outer cylindrical wall 22 extending between two end walls 24 and 26. Output shafts 28 and 30 extend through openings 18 and 19 in the stator. The outside diameter of cylindrical wall 22 of the rotor is slightly less than the inside diameter of cylindrical wall 17 of the stator. The distance between end wall 14 and 16 of stator 10 is slightly greater than the distance between end wall 24 and 26 of rotor 20 so that the rotor can rotate with close tolerances in the stator. In the exemplary embodiment, the circumference of the rotor is about 1 meter; the outside diameter is thus about 32 cm. Size is not critical and may vary for different applications.

Although the description refers to rotating movement, applicant contemplates linear motion also, in which a linear stator moves a object with linear cooperating structure along the stator.

The stator 10 and the rotor 20 are each constructed of more than one component for manufacturing and assembly. Suggested part divisions are shown in FIGS. 1 and 2. Rotor 20 is constructed of several cylindrical plates 31, 32, 33, 34, 35 and 36 and shaft members 28 and 30(FIG. 2), which are attached together. Likewise stator 10 is constructed of a plurality of cylindrical rings 39, 40, 41, 42, 43, 44 and 45 attached together in a manner similar to the construction of rotor 20.

Magnetic radial ring bearings on the rotor and the stator provide a magnetic cushion in the present invention to support the rotor within the stator and eliminate frictional contact between the surfaces of walls 17 and 22 (FIG. 2). Magnetic radial bearings center the rotor within the stator and prevent contact between the end wall 24 and 26 of the rotor and walls 14 and 16 of the stator. In the exemplary embodiment, the magnetic ring bearings consist of individual high energy magnets in four rings about rotor wall 22 and about the stator wall 17 (FIG. 2). Magnets in rings 50, 51, 52 and 53 of the stator set of ring magnets face magnets in rings 55, 56, 57 and 58 of the rotor set of ring magnets. In the exemplary embodiment, there are thirty-two magnets in rings 55, 56, 57 and 58 and forty magnets in rings 50, 51, 52 and 53. The stator uses more magnets because its rings have a larger circumference than the rings in the rotor. The poles of the magnets facing across the gap between the outside of the rotor and the inside of the stator (e.g. the poles in the magnets of ring 50 facing the rotor and the poles in magnets 55 facing the stator) are the same so that they repel. One may reverse some of the magnets in the upper part of stator rings 50, 51, 52 and 53 so that they attract magnets in the rotor rings 55, 56, 57 and 58 to compensate, in part, for gravity acting downward on rotor 20.

One of the advantages of having a different number of magnets in the stator ring than in the rotor ring is that the arrangement prevents the magnets from becoming aligned. If there were an equal number of magnets, the repulsion would tend to rotate the rotor until each magnet on the rotor ring was located between two adjacent magnets on the stator ring to lock up the rotor and the stator. The problem from having equal number of magnets between the two rings can be avoided somewhat by staggering the magnets in adjacent rings (e.g., staggering magnets in ring 50 relative to the magnets in ring 51).

One or more magnets in each rotor 55, 56, 57 or 58 may be of an opposite pole. Magnets subjected to constant repelling forces tend to be shorter lived. An occasional magnetic attraction tends to increase the magnetic life of the magnets. The rotor magnets receive opposite magnetic fields because of the opposite magnets on the top half of the stator ring.

FIGS. 1 and 2 show four opposing rings of magnets. One may vary the actual number of rings necessary for the size, weight, maximum velocity and intended application of the motor.

The motor also includes axial bearings for centering the rotor axially within the stator. The magnetic radial bearings of the exemplary embodiment consist of two sets of individual high energy magnets arranged in a radial pattern (FIG. 2). Magnets 60 and 62 are embedded into end walls 24 and 26 of the rotor with the same (e.g., north) magnetic pole facing outward. Magnets 64 and 66 are embedded into end wall 14 and 16 and are aligned with and face magnets 60 and 62 with the same magnetic pole that faced outward on magnets 60 and 62 face inward toward magnets 60 and 62. The magnetic poles of each set repel each other to center the rotor within the stator and prevent contact between the end walls 24 and 26 of the rotor and the side walls of the central rotor cavity 12 of the stator.

Rotor 20 has a rotor set of magnets. In the exemplary embodiment, the magnets of the rotor set of magnets are permanent horseshoe magnets 70 with spaced apart, opposite north 72 and south 74 (FIGS. 3, 4 and 5) poles facing outward about the periphery of the rotor (FIGS. 1 and 2). The exemplary embodiment has sixteen such horseshoe magnets axially centered and evenly spaced about the rotor, each 22.5° apart. As is evident in the following description of the operation of the motor, the number of horseshoe magnets 70 can vary. Generally, increasing the number of horseshoe magnets increases the torque because more horeshoe magnets are in closer proximity to electromagnets on the stator that push or pull the horseshoe magnets. Fewer horseshoe magnets increase the potential speed because the electromagnets on the stator do not have to be switched as often. Two horseshoe magnets spaced 180° apart would function, but it is believed that four horseshoe magnets spaced 90° apart would provide a much higher speed, and three horseshoe magnets spaced 120° would provide the highest speed. Sixteen horseshoe magnets are considered the maximum for proper matching of the torque to the rotational velocity.

Figure 3:
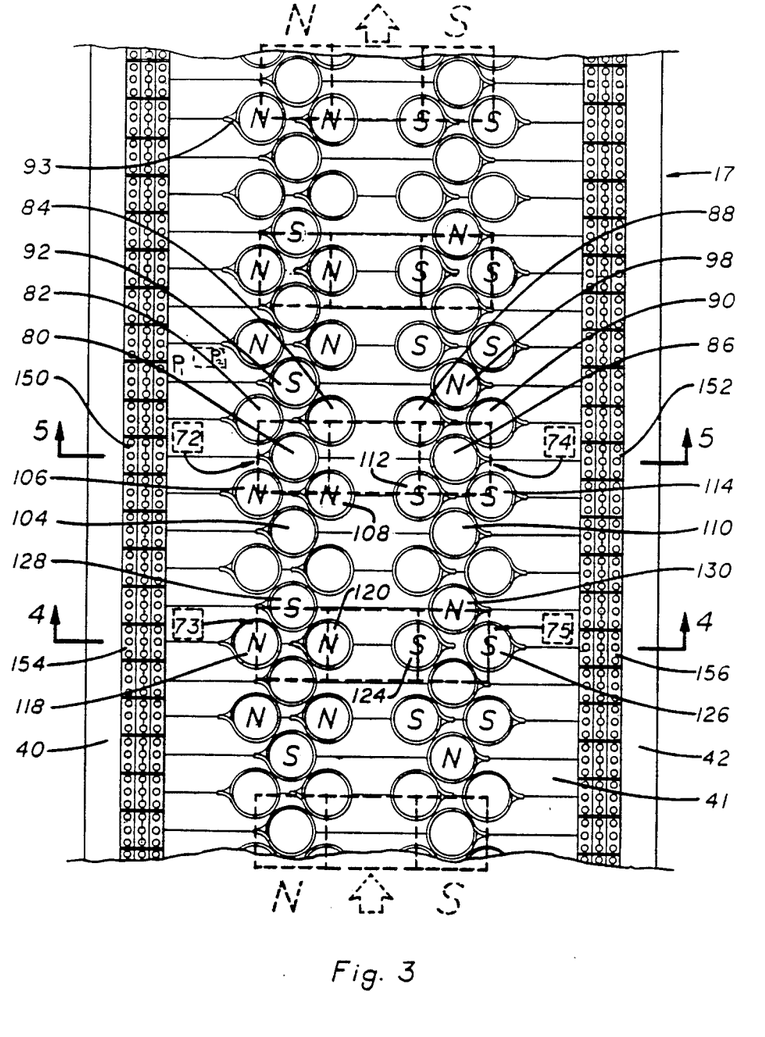

In one embodiment, a stator group of electromagnets faces inward about the rotor cavity. As FIG. 3 shows (see also FIGS. 1, 2, 4 and 5), the stator group of electromagnets is in pairs of arrays. The term "array" in this embodiment refers to three electromagnets adjacent each other. In FIG. 3, electromagnets 82, 84 and 92 form one array, of a group, and electromagnets 88, 90 and 98 form the other array of the group. The arrays extend about two inside circumferences of the inner surface 17 of the rotor cavity 12 of stator 10. They are aligned with circumferences, each passing through one pole 72 or 74 of the rotor set of horseshoe magnets 70. Arrays of electromagnets 80, 82 and 84 and of electromagnets 92, 94 and 96 are aligned with the north pole 72 (shown as a dashed square outline in FIG. 3) of the horseshoe magnet, and the arrays of electromagnets 106, 108 and 80 and of 112, 114 and 86 are aligned with the south pole 74.

Electromagnets 80', 82', 84', 86', 88' and 90', shown in FIGS. 1 and 2, are representative of the electromagnets of the motor. A coil of wires surrounds each electromagnet. Only wiring 93 leading to an electromagnet has a reference numeral. The letters N (north) or S (south) indicate the pole of many of the electromagnets in FIG. 3. There are forty pairs of arrays, five pairs of arrays for every two horseshoe magnets 70 in the exemplary embodiment.

Each array has a first, center electromagnet 80 (also electromagnets 86, 92 and 98) positioned so that the pole 72 of the rotor magnet passes directly over the pulling electromagnet. "Over" means toward the central axis of rotor 20 and is the orientation of FIGS. 4 and 5. In the exemplary embodiment, the central electromagnet has a magnetic pole when energized the opposite to the pole of the rotor magnet. Pole 72 of the horseshoe magnet is north, and the pole of the electromagnet 80 is south. They attract. For that reason, the first electromagnets are called "pulling" electromagnets.

Each array also includes two adjacent, axially aligned second electromagnets 82 and 84 circumferentially offset from the first, center electromagnet 80 such that a first and two second electromagnets form a triangle (FIG. 3). Triangular arrays are believed to maximize magnetic field per unit area. Magnets arranged in a single circumferential path could also work but with a corresponding reduction in force. The second electromagnets are of a magnetic pole when energized the opposite of the central electromagnet. Thus the poles are the same as the pole of the rotor magnet. Electromagnets 82 and 84 are north poles when energized. They repel north pole 72 of the horseshoe magnet and are therefore called "pushing" electromagnets.

It is also contemplated that each electromagnet could switch from pulling to pushing and back to pulling. Separating the pulling and pushing functions to distinct electromagnets is believed to allow for more rapid switching.

It is important in the motor of the present invention that both pulling and pushing electromagnets acts together on the poles of the horseshoe magnet. The motor would work well if all the pulling electromagnets became pushing ones and all the pushing ones became pulling ones. For simplification in the discussion of this embodiment, the first, center electromagnets remain pulling ones, and the second electromagnets remain pushing ones.

Switches, described in more detail below, alternatively pass or block current to the electromagnets. The switches energize the pulling electromagnets 80 and 86 when poles 72 and 74 of the rotor magnet pass an adjacent, preceding, pulling electromagnets 104 and 110 (FIG. 3). The switches then de-energize the pulling electromagnet when the rotor magnet passes that pulling electromagnets. In FIG. 3 of the exemplary embodiment, the poles of the rotor, horseshoe magnets are moving in the direction of the dashed arrows. Poles 72 and 73 are north poles. Poles 74 and 75 are south poles. As soon as poles 72 and 74 of the horseshoe magnet pass the preceding pulling electromagnets 104 and 110, electromagnets 80 and 86 are energized. Because the electromagnets are of opposite polarity to that of the poles of the respective horseshoe magnet, the electromagnets and the horseshoe magnets attract. Of course, electromagnets 104 and 110 are de-energized at the same time.

When the current drops rapidly in pulling electromagnets 104 and 110, an opposite current is induced momentarily in the windings of the electromagnets. This opposite current causes a momentary reversal of the magnetic pole of the electromgnet. Therefore, for an instant, normally south pole electromagnet 104 becomes a north pole, and electromagnet 110 becomes a south pole. Both provide an impulse repelling the poles of horseshoe magnets 72 and 74 in the direction of the arrow in FIG. 3.

Electromagnets 80 and 86 remain energized until the poles of the horseshoe magnets are over the electromagnets. If the electromagnets remained energized after the poles of the horsehoe magnets passed the electromagnet, the attraction of the poles would stop rotation of the rotor in the desired direction.

The switches also energize the pushing electromagnets when the rotor magnet is axially aligned with the pushing electromagnets and de-energizes the pushing electromagnets when the rotor magnet is axially aligned with adjacent, subsequent pulling electromagnets. In the exemplary embodiment when poles 72 and 74 of the horseshoe magnet, which are moving up (FIG. 3), pass the center line of pushing electromagnets 106, 108, 112 and 114, those electromagnets are energized. The electromagnets are of the same polarity to that of the poles of the respective horseshoe magnet so the electromagnets and the horseshoe magnets repel. At the same time, electromagnets 82, 84, 88 and 90 must remain de-energized so that they will not repel the poles of the horseshoe magnet approaching, which would retard rotation of the rotor.

Electromagnets 106, 108, 112 and 114 remain energized until the poles of the approaching horseshoe magnet are closer than the poles of the horseshoe magnet that just passed the electromagnets. Electromagnets 106, 108, 112 and 114 remain energized until the poles of the passing horseshoe magnet 72, 74 are axially alinged with the poles of electromagnets 92 and 98.

As FIG. 3 (and FIGS. 4 and 5, in part) show, at any instant, when one horseshoe magnet is directly over one magnet in an array of electromagnets, the adjacent horseshoe magnets are offset in their position with respect to the corresponding magnet of the nearest array of electromagnets. Thus, poles 72 and 74 of the horseshoe magnet are directly over first electromagnets 80 and 86. The poles of the horseshoe magnet 73 and 75 below (FIG. 3) of poles 72 and 74 are aligned with second electromagnets 118, 120, 124 and 126. At that instant, electromagnets 106, 108, 112 and 114 are repelling and pushing poles 72 and 74 of the horseshoe magnet ahead. Second electromagnets 82, 84, 88 and 90 are de-energized so that they do not repel forward movement of the horseshoe magnets. First electromagnets 92 and 98 are being energized so that they attract poles 72 and 74. First electromagnets 104 and 110 are off, and second electromagnets 118, 120, 124 and 126 are being energized to start repelling poles 73 and 75. Electromagnets 128 and 130 are still energized to attract the poles of the horseshoe magnets 73 and 75. They route smoothly because the poles of one horseshoe magnet are directly over the first electromagnet and at the same time the poles of the adjacent horseshoe magnet are aligned with the second electromagnets.

The second embodiment employs similar construction to the first embodiment. The poles of the magnets do not change form the first embodiment, and both use FIG. 3 for reference. Electromagnets 106, 108 and 80 form one array of a group, and electromagnets 112, 114 and 86 form the other array of the group. In this embodiment electromagnets 106, 108 and 92 energize and de-energize together, and electromagnets 112, 114 and 98 similarly cooperate. North pole 72 of the horseshoe magnet attracts the south pole of first electromagnet 80. Therefore, first electromagnets 80 (and 104 and 128) are called "pulling" electromagnets.

Axially aligned second electromagnets 82 and 84 form a triangle with first, center electromagnet 80. Electromagnets 92, 106 and 108 also form a triangle. These magnets and similar sets cooperate in this embodiment in a manner explained below. The poles of the second electromagnets (82, 84, 106 and 108) are the same as the pole of the rotor magnets 72 and 73. Electromagnets 82, 84, 106, 108, etc. are, therefore, called "pushing" electromagnets.

In the second embodiment, the switches energize the pulling electromagnets 92 and 98 and pushing electromagnets 106, 108, 112 and 114 when poles 72 and 74 of the rotor magnet pass pushing electromagnets 106, 108, 112 and 114 (FIG. 3). The switches then de-energize those pulling electromagnet when the rotor magnet passes the pulling electromagnets. The poles of the rotor, horseshoe magnets move in the direction of the dashed arrows. When poles 72 and 74 of the horseshoe magnet pass pulling electromagnets 104 and 110, those electromagnets and pushing electromagnets 118, 120, 124 and 126 are de-energized. Because the pulling electromagnets are of opposite polarity to that of the relative poles of the horseshoe magnets, the electromagnets and the horseshoe magnets attract. Because the pushing electromagnets are of the same polarity as that of the relative poles of the horseshoe magnets, the electromagnets and the horseshoe magnets repel.

The rapid current drops in pulling electromagnets 104 and 110 induces a momentary opposite current in the windings of the electromagnets and a momentary reversal of the magnetic pole of the electromagnet. The reversed poles provide an impulse repelling the poles of horseshoe magnets 72 and 74 in the direction of the arrow in FIG. 3. Momentary field reversal in electromagnets 106, 108, 112 and 114 causes poles 73 and 75 of the horseshoe magnet to attract.

Electromagnets 96 and 98 remain energized until the poles of the horseshoe magnets are over those electromagnets. If the electromagnets remained energized after the poles of the horseshoe magnets passed the electromagnets, the attraction of the poles would stop rotation of the rotor in the desired direction.

Figure 4:
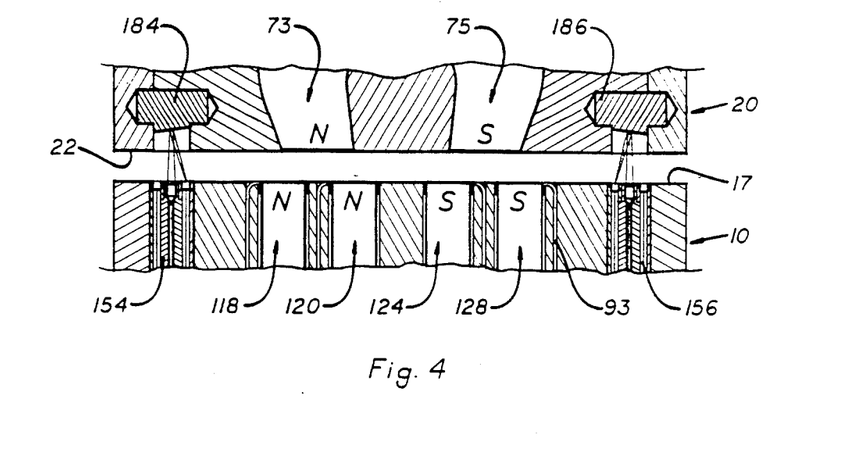
FIG. 4 is a sectional view of portions of the rotor and stator of the brushless DC motor of the present invention taken through plane 4—4 of FIG. 3.
Figure 5:
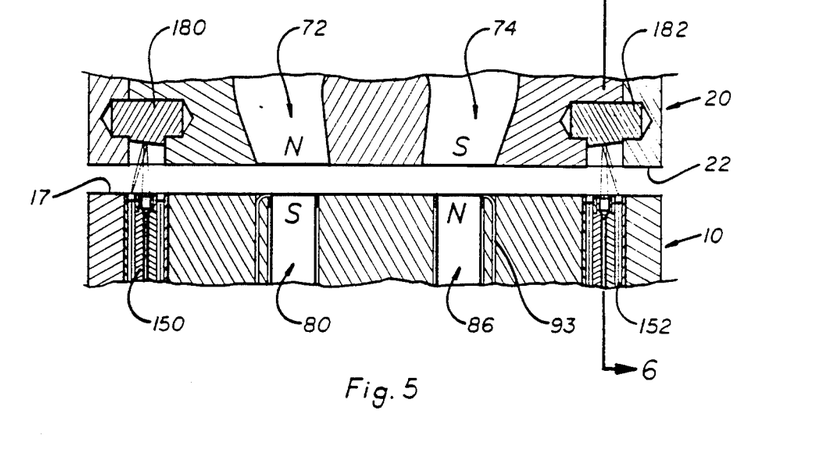
FIG. 5 is an other sectional view of portions of the rotor and stator of the brushless DC motor of the present invention taken through plane 5—5 of FIG. 3.
Figure 6:
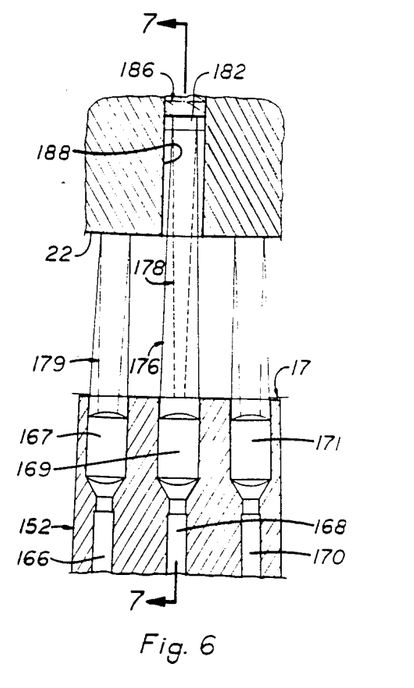
FIG. 6 is a sectional view of a portion of optical sensor on the rotor and stator of the brushless DC motor of the present invention taken through plane 6—6 of FIG. 5.

In both embodiments, when one horseshoe magnet is directly over one magnet in an array of electromagnets, the adjacent horseshoe magnets are offset in their position relative to the corresponding magnet of the nearest array of electromagnets (FIG. 3 and, in part, FIGS. 4 and 5). Thus, poles 72 and 74 of the electromagnet are directly over first electromagnets 80 and 86. The poles of the horseshoe magnet 73 and 75 below (FIG. 3) of poles 72 and 74 are aligned with second electromagnets 118, 120, 124 and 126. At that instant, electromagnets 106, 108, 112 and 114 are repelling and pushing poles 72 and 74 of the horseshoe magnet ahead. Second electromagnets 82, 84, 88 and 90 are de-energized so that they do not repel forward movement of the horseshoe magnets. First electromagnets 92 and 98 are being energized so that they attract poles 72 and 74. First electromagnets 104 and 110 are on, and second electromagnets 118, 120, 124 and 126 are being energized to repel poles 73 and 75. Electromagnets 128 and 130 are still energized to attract the poles of the horseshoe magnets 73 and 75. They rotate smoothly because the poles of one horseshoe magnet are directly over the first electromagnet and at the same time the poles of the adjacent horseshoe magnet are aligned with the second electromagnets.

Note that the principal difference between the first and second embodiments is as follows. In the first embodiment, three adjacent electromagnets work together. In the second embodiment, however, the two adjacent second electromagnets turn on and off with a center, first electromagnet one place forward from the adjacent one. Therefore, the force vectors change.

The previous discussions are somewhat idealized. Electronic circuitry can provide very rapid switching of current to the electromagnets. Hysteresis effects in the electromagnets prevents the magnetic flux from reaching its maximum value instantaneously when energized and from reaching a zero value instantaneously when de-energized. Proper timing prevents possible negative effects from the failure of the magnets to energize and de-energize instantaneously. Timing can use the lead in and fade out effects of the magnetic field. Moreover, the timing can also utilize the impulse effect, previously discussed, created from the rapid change of the current flow in the coils of the electromagnets.

Each array of stator electromagnets has rotor position sensing means. One rotor position sensing means is axially aligned with each first electromagnet. Another rotor position sensing means is axially aligned with the second electromagnets. The sensing means senses the position of points on the rotor relative to corresponding points on the stator. The components of the sensing means of the first exemplary embodiment are shown in FIGS. 4 through 10. The sensing means use light sensors in the following manner.

Sensor arrays mount in one or more circumferential sets about the periphery of rotor cavity 12 of stator 10. Two sets are located axially outside the electromagnets in FIG. 3. Only one set is needed, and it may be axially centered in the rotor cavity between the two arrays of a pair of arrays of electromagnets. The two sets in the exemplary embodiment are for redundancy. Four sensor arrays 150 and 154 on the left side and array 152 and 156 on the right side (FIG. 3) are referred to by number in the drawings. The other arrays are the same.

Figure 8:
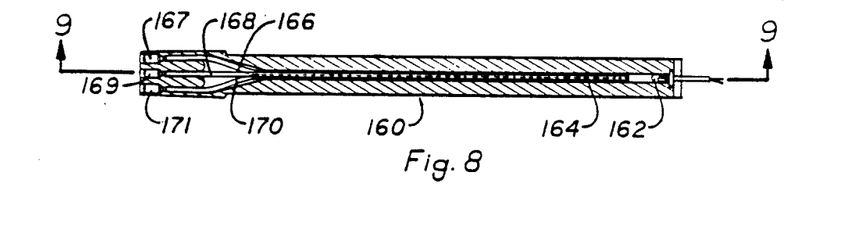
FIG. 8 is a sectional view of the optical cable of the position sensing means of the brushless DC motor of the present invention.
Figure 9:
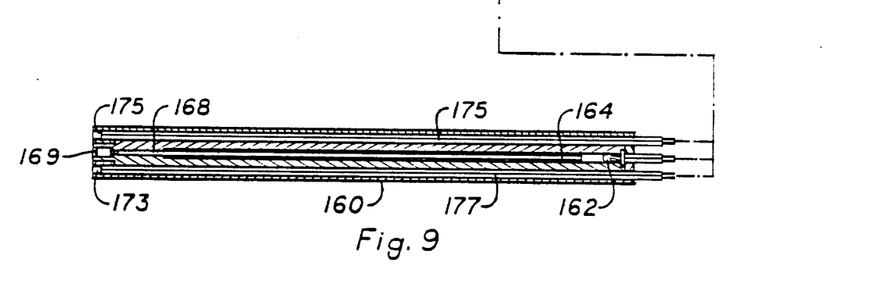
FIG. 9 is a section view of the optical cable of the brushless DC motor of the present invention taken through plane 9—9 of FIG. 8.
Figure 10:
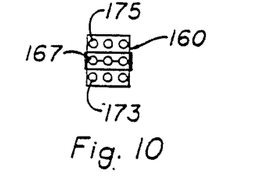
FIG. 10 is a bottom, plan view of the optical cable of the brushless DC motor of the present invention.

The arrays each comprise light relay units 160 (FIGS. 8, 9 and 10). Each light relay unit has an LED 162 or some other small light emitting device at the top of fiber optic cable bundle 164. The bottom end of cable bundle 164 splits into three individual cables 166, 168 and 170 (FIG. 8). Each cable ends in a lens 167, 169 or 171.

Each horseshoe magnet on the rotor has at least one reflector associated with it. Two reflectors spaced from the horseshoe magnets (FIGS. 4 and 5) are used in the exemplary embodiment, which uses two sets of sensors. Half of the horseshoe magnets have reflectors that are angled to reflect the light slightly outward, such as reflectors 180, 182 in FIGS. 5 and 7. The other half of the reflectors such as reflectors 184 and 186 (FIG. 4) angle to reflect the light inward somewhat.

Figure 7:
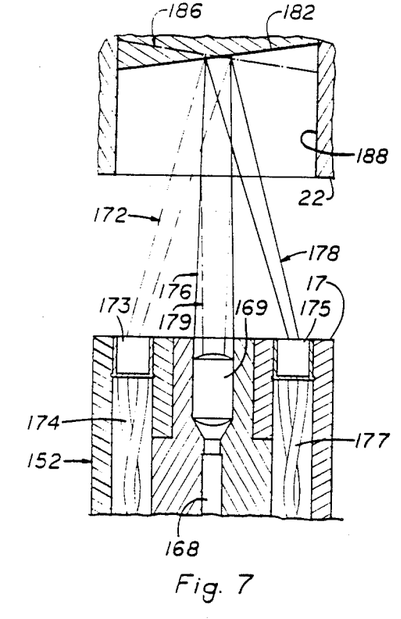
FIG. 7 is a sectional view of the optical sensor of the brushless DC motor of the present invention taken along plane 7—7 of FIG. 6.

A pair of light sensors is associated with each of the three fiber optic cables 166, 168 and 170. FIG. 7 shows the sensors 173 and 175 associated with fiber optic cable 168 and its associated focusing element 169. Depending on the angle of the face of the reflective surface of reflector 182 or 186 (FIGS. 4 and 5), light beam 176 reflects either to sensor 173 or 175. When sensor 173 or 175 receives a light signal, it generates a voltage in wires 174 or 177, which in turn signals the switching circuit shown schematically as circuit card or board 190 (FIG. 9 and FIGS. 1 and 2).

Referring to sensor arrays 150 and 152 in FIG. 3, when pole 72 of horseshoe magnet 70 is over first electromagnet 80, reflectors 180 and 182 (FIG. 5) reflects light outward where sensors 173 sense it. The signal from sensors 173 then reaches circuit 190 where a microprocessor uses the sensed information to determine the position of a hypothetical point, such as point $p_1$ (FIG. 3) on rotor 12 corresponding to a position relative to a hypothetical point $p_2$ on the stator such as the position of the horseshoe magnet which has poles 72 and 74.

Each reflector 180, 182, 184 and 186 passes six pairs of sensors in the two arrays as poles 72 and 73 travel between adjacent, first electromagnets 80 and 92 and 88 and 90 (FIG. 3). By dividing the distance between adjacent arrays of electromagnets into smaller divisions, more precise positioning information of the position of the rotor relative to corresponding points on the stator is available. As a result, one can use the information for more accurate timing of the energizing and de-energizing of the electromagnets.

It is important that stray reflections from the reflective surfaces do not reflect accidentally to an unintended sensor. As FIGS. 4, 5, 6 and 7 show, the reflective surface of reflectors 180, 182, 184 and 186 are inset from wall 22 of rotor 12. Wall 188 (FIGS. 6 and 7) which surrounds the reflective surfaces of the reflectors capture any stray reflections. The surface of wall 188 should be black to absorb reflected light. The shape and length of walls 188 and the positioning of the reflective surfaces may vary.

Circuit card 190 contains the microprocessor that receives positioning information from wires 174 and 177 and activates or deactivates the corresponding electromagnets and switching means between the source of current and each electromagnet. In the exemplary embodiment, each group of electromagnets has its own circuit card. By modifying the circuit on each circuit card, one microprocessor could control two or more groups. Although a single microprocessor could control all the electromagnets, its switching speed may not be as fast as having separate microprocessors for a single set or adjacent groups of arrays of electromagnets.

The motor may rotate so fast that the light sensors will be unable to control the electromagnets in the manner previously described. If that occurs, the motor can switch to a higher speed mode in which the light sensors count reflection over a time unit. The microprocessors in circuit card 190 convert the signal to rotational velocity and control the electromagnets based on he velocity.

Rotation of the rotor starts by sequentially tracking the first, center electromagnets 104, 80, 92 and 110, 86, 98 until the sensors detect rotary motion. Once this is accomplished, normal switching of the electromagnets begins. Reversing the firing order of the electromagnets terminates motor rotation. The pushing electromagnets are electrified as the horseshoe magnet approaches, and the adjacent pushing electromagnet is electrified after the horseshoe magnet passes. This process creates reverse rotational forces on the horseshoe magnets, which retard and eventually stops forward motion. In theory, the motor could also be run in reverse.

Figure 11:
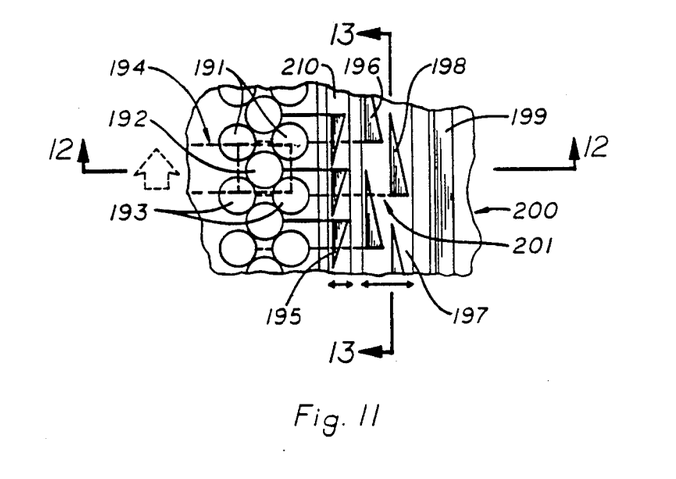
FIG. 11 is a plan view of the inside surface of the stator of a second embodiment of the DC motor of the present invention which uses brushes.
Figure 12:
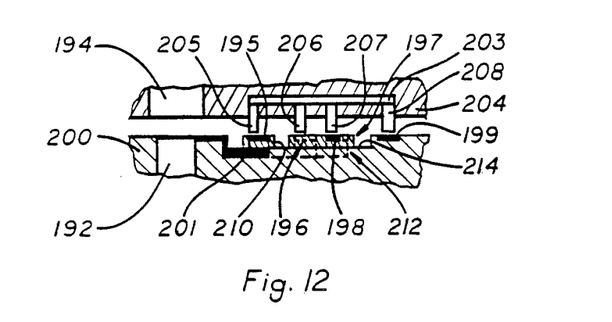
FIG. 12 is a sectional view of the stator and rotor of the DC motor of the second embodiment of the present invention taken through plane 12—12 of FIG. 11.
Figure 13:
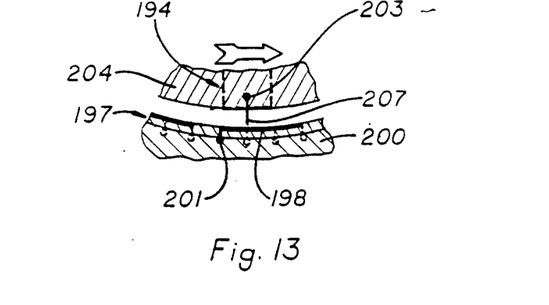
FIG. 13 is a sectional view of the stator and rotor of the DC motor of the second embodiment of the present invention taken through plane 13—13 of FIG. 11.

The second exemplary embodiment uses commutator brushes rather than the light sensors. Referring to FIGS. 11, 12 and 13, rotor 204 mounts a brush 203, which includes outwardly facing contacts in the form of brush members 205, 206, 207 and 208, all of which are in electrical contact with each other (FIG. 12). Brush member 203 is adjacent at least one of the poles of horseshoe magnet 194. Stator electrical contacts, mounted on the inside periphery of the stator central cavity, are electrically connected to the electromagnets in the following manner. Each contact 195 connects to a first initial, central electromagnet 192. Contacts 196 are outside of contacts 195. One contact connects to both front electromagnets 191 (FIG. 11). Contacts 198 are to the right (FIG. 11) of contacts 196. Contacts 198 are electrically connected to the second electromagnets 193 immediately behind the first-mentioned second electromagnets 191. Contacts 195 are mounted on a short stage 210 (FIG. 12), and contacts 196 and 198 are mounted on a second stage 197. Both of the stages extend inward from circumferential groove 214 (FIG. 12). Stator 200 also has a continuous contact strip 199.

As FIG. 12 shows, rotor contact 205 makes electrical contact with successive stator contacts 195. Brushes 206 and 207 make electrical contact with stator contacts 198 and 196, respectively. Rotor contact 203 always contacts a portion of conductive band 199. In FIG. 12, electrical contact 205 is still touching one of the stator electrical contacts 195 so that current from band 199 flows through brush 203 into contact 196, through connection 201 to electromagnet 192. Electrical contact 206 on brush 203 is not touching any of stator electrical contacts 196, but it is about to touch the front end of one electrical contact 196. Therefore, electromagnets 191 are not energized. Electromagnets 193 are energized because stator contact 207 is touching electrical contact 198. Control of the various electromagnets changes as different contacts 205, 206 or 207 touch different electrical contacts 195, 196 or 198.

In the second exemplary embodiment, electrical contacts 195, 196 and 198 are triangularly shaped. If contacts 195, 196 and 198 move to the left (FIG. 11), the length of time during which rotor contacts 205, 206 and 207 touch them decreases. Adjusting the times of contact, modifies the timing of the electromagnets to change the velocity of the motor. Stages 210 and 212 are, therefore, movable to the left and right (FIGS. 11 and 12) in groove 214 to accomplish the speed changes.

The previous discussion referred to a rotating motor. The inside surface 17 of stator 10 is flat in a linear motor. The parts that correspond to the rotor move along the flat surface 17. The actual conversion from a rotating to a linear motor suggests itself to workers in the field.

Particular embodiments of the invention have been shown and described, but numerous variations and alternative embodiments will occur to those skilled in the art.

I claim:

1. A DC motor comprising:
   a. a stator having a central rotor cavity and containing a stator set of electromagnets facing inward in a circumferential path about the rotor cavity;
   b. a rotor rotatably mounted in the central rotor cavity, the rotor having a rotor set of magnets, each magnet of the rotor set of magnets having at least one pole facing outward in a circumferential path about the periphery of the rotor and aligned with the electromagnets of the stator sets of electromagnet;
   c. a source of current to each electromagnet of the stator set of electromagnets;
   d. rotor position sensing means for each electromagnet of the stator set of electromagnets for sensing the position of points on the rotor with regard to corresponding points on the stator; and
   e. switching means between the source of current and each electromagnet of the stator set of electromagnets and operably connected to a corresponding rotor position sensing means for alternatively controlling current to selected electromagnets, the switching means energizing the electromagnets to be of a pole to attract the pole of the magnets of the rotor set of magnet when the magnets of the rotor set of magnets approach the electromagnet and energizing the electromagnets to be of a pole to repel the pole of the magnets of the rotor set of magnets when the magnets of the rotor set of magnets recedes from the electromagnets as the rotor rotates.

2. The DC motor of claim 1, wherein the stator set of electromagnets is in arrays of at least two electromagnets, a first and a second electromagnet having opposite poles when energized, the switching means alternatively passing or blocking current to selected electromagnets.

3. The DC motor of claim 2, wherein the switching means energizes the first electromagnet when said each magnet of the rotor set of magnets reaches a first, predetermined position with respect to another electromagnet and de-energizing the first electromagnet when said each magnet of the rotor set of magnets reaches a second, predetermined position with respect to the first electromagnet.

4. The DC motor of claim 2, wherein the switching means energizes the first electromagnet when said each magnet of the rotor set of magnets reaches a first, predetermined position with respect to the second electromagnet immediately forward in the direction of movement of the rotor and de-energizing the first electromagnet when said each magnet of the rotor set of magnets reaches a second, predetermined position with respect to the same electromagnet.

5. The DC motor of claim 2, wherein the switching means energizes and deenergizes together the second electromagnet and the first electromagnet immediately forward of the second electromagnet in the direction of movement of the rotor.

6. The DC motor of claim 2, wherein the switching means energizes and deenergizes together the second electromagnet and the first electromagnet immediately forward of the immediately forward second electromagnet in the direction of movement of the rotor.

7. The DC motor of claim 1, wherein the stator set of electromagnets is in arrays of at least two electromagnets, a first and a second electromagnet having opposite poles when energized, the switching means alternatively passing or blocking current to selected electromagnets, the switching means energizing the first electromagnet when the rotor magnet reaches a first, predetermined position with respect to an adjacent, preceding, first electromagnet and de-energizing the first electromagnet when the rotor magnet reaches a second predetermined position with respect to the first electromagnet, the switching means energizing the second electromagnets when the rotor magnet reaches a third predetermined position with respect to the second electromagnets and de-energizing the second electromagnet when the rotor magnet reaches a fourth predetermined position with respect to an adjacent, subsequent second electromagnet.

8. The DC motor of claim 1, wherein the first electromagnets have a magnetic pole when energized opposite to the pole of said each magnet of the rotor set of magnets that is aligned with the stator set of electromagnets.

9. The DC motor of claim 1, wherein the stator set of electromagnets is in two arrays, each array aligned with one pole of the rotor set of magnets, each array comprising a first electromagnet positioned so that the pole of the rotor magnet passes over the first electromagnet, the array further comprising two adjacent, axially aligned second electromagnets circumferentially offset from the first electromagnet and of a pole when energized the opposite as the pole of the first electromagnet.

10. The DC motor of claim 9, wherein the stator set of electromagnets comprise five pairs of consecutive arrays of electromagnets for each two consecutive rotor magnets.

11. The DC motor of claim 1, wherein each rotor position sensing means comprises a source of light and two optical sensors spaced from the source of light, and a reflector positioned on the rotor such that the reflector reflects light from a source of light to one light sensor.

12. The DC motor of claim 11 wherein each reflector is positioned at a predetermined location with respect to one corresponding rotor magnet, the reflector associated with each rotor magnet being angled to reflect light from the source of light to the corresponding sensor.

13. The DC motor of claim 1, wherein the central rotor cavity of the stator is cylindrical with two end walls, the rotor being cylindrical and having two end walls, the motor further comprising a set of stator positioning magnets located about the periphery of the stator central rotor cavity and a corresponding set of rotor positioning magnets about the periphery of the rotor and aligned with the stator set of positioning magnets for centering the rotor within the central rotor cavity of the stator.

14. The DC motor of claim 13, further comprising radial magnetic bearings located on each end of the rotor and the stator for longitudinally centering the rotor within the stator.

15. The DC motor of claim 1, wherein each magnet of the rotor set of magnets are horseshoe shaped with opposite poles spaced apart and facing outward about the periphery of the rotor.

16. The DC motor of claim 11, wherein each of said sensors is mounted within a recess.

17. A DC motor comprising:
a. a stator having a central rotor cavity and containing a stator set of electromagnets facing inward about the rotor cavity;
b. a rotor rotatably mounted in the central rotor cavity, the rotor having a rotor set of magnets having spaced apart, opposite poles facing outward about the periphery of the rotor;
c. electromagnets of the stator set of electromagnets being in two arrays, each array aligned with one pole of the a magnet of the rotor set of magnets, each array comprising a first electromagnet positioned so that the one pole of the rotor set of magnets passes over the first electromagnet, each array further comprising two adjacent, axially aligned second electromagnets circumferetially offset from the first electromagnet and of a pole when energized the opposite as the pole of the first electromagnet;
d. a source of current to each electromagnet of the stator set of electromagnets;
e. rotor position sensing means for each array of stator electromagnets, at least one rotor position sensing means being axially aligned with the first electromagnet and at least another rotor position sensing means being axially aligned with the second electromagnets for sensing the position of points on the rotor with regard to corresponding points on the stator; and
f. switching means between the source of current and each electromagnet of the stator set of electromagnets and operably connected to a corresponding rotor position sensing means for alternatively passing or blocking current to selected electromagnets.

18. The DC motor of claim 17, wherein the switching means energizing the first electromagnet when the rotor set of magnets reaches an adjacent, preceding, first electromagnet and de-energizing the first electromagnet when the rotor set of magnets passes the first electromagnet, the switching means energizing the second electromagnets when the rotor magnet is axially aligned with the second electromagnets and de-energizing the first electromagnets when the rotor set of magnets is axially aligned with adjacent, subsequent second electromagnets.

19. The DC motor of claim 18, wherein the first electromagnet of each array of stator electromagnets has a magnetic pole when energized opposite to the pole of the rotor set of magnets that passes over the first electromagnet.

20. The DC motor of claim 18, wherein the stator set of electromagnets comprise five pairs of consecutive arrays of electromagnets for each two consecutive rotor magnets.

21. The DC motor of claim 18, wherein each rotor position sensing means comprises a source of light and two optical sensors spaced from the source of light, a reflector positioned on the rotor such that the reflector reflects light from a source of light to one light sensor.

22. The DC motor of claim 21, wherein each reflector is positioned at a predetermined location with respect to one rotor magnet, the reflector associated with one rotor magnet being angled to reflect light from the source of light to one sensor, the reflector associated with adjacent rotor magnets being angled to reflect light from the source of light to the other sensor.

23. The DC motor of claim 18, wherein the central rotor cavity of the stator is cylindrical with two end walls, the rotor being cylindrical and having two end walls, the motor further comprising a set of stator positioning magnets located about the periphery of the stator central rotor cavity and a corresponding set of rotor positioning magnets about the periphery of the rotor and aligned with the stator set of positioning magnets for centering the rotor within the central rotor cavity of the stator.

24. The DC motor of claim 18, further comprising radial magnetic bearings located on each end of the rotor and the stator for longitudinally centering the rotor within the stator.

25. The DC motor of claim 18, wherein each rotor position sensing means comprises a first set of stator electrical contacts on a first circumferential path on the central rotor cavity, each connected to an initial electromagnet, a second set of stator electrical contacts in two circumferential paths on the central rotor cavity, one electrical contact of the second set of electrical stator contacts being electrically connected to a second set of second electromagnets, and the contacts in second path of the second set of stator electrical contacts being connected to adjacent array of second electromagnets, rotor electrical contacts facing outward about the periphery of the rotor and positioned to contact the stator electrical contacts.

26. The DC motor of claim 25, wherein the stator set of electrical contacts are shaped such that the distance that the rotor electrical contacts contact the stator electrical contacts varies with respect to the longitudinal position of the rotor electrical contacts relative to the stator electrical contacts, and means for adjusting the longitudinal position of the stator electrical contacts relative to the rotor electrical contacts.

27. A DC motor comprising:
   a. a stator containing a stator set of electromagnets in a path along the stator;
   b. a moving member mounted adjacent the stator, the moving member having a second set of magnets, each magnet of the second set of magnets having at least one pole facing toward and aligned with the stator set of electromagnets;
   c. a source of current to each electromagnet of the stator set of electromagnets;
   d. position sensing means for each electromagnet of the stator set of electromagnets for sensing the position of points on the moving member with respect to corresponding points on the stator; and
   e. switching means between the source of current and each electromagnet of the stator set of electromagnets and operably connected to a corresponding position sensing means for alternatively controlling current to selected electromagnets, the switching means energizing the electromagnets to be of a pole to attract the pole of the second set of magnets when the second magnet approaches the electromagnet and energizing the electromagnets to be of a pole to repel the pole of the second set of magnets when the second magnet recedes from the electromagnets.

* * * * *